United States Patent
Wang et al.

(10) Patent No.: US 11,556,732 B2
(45) Date of Patent: Jan. 17, 2023

(54) METHOD FOR EXTRACTING RIVET POINTS IN LARGE SCALE THREE-DIMENSIONAL POINT CLOUD BASE ON DEEP LEARNING

(71) Applicant: NANJING UNIVERSITY OF AERONAUTICS AND ASTRONAUTICS, Jiangsu (CN)

(72) Inventors: Jun Wang, Jiangsu (CN); Kun Long, Jiangsu (CN); Qian Xie, Jiangsu (CN); Dening Lu, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 37 days.

(21) Appl. No.: 17/169,509

(22) Filed: Feb. 7, 2021

(65) Prior Publication Data
US 2022/0121875 A1    Apr. 21, 2022

(51) Int. Cl.
*G06K 9/62* (2022.01)
*G06V 10/44* (2022.01)
(Continued)

(52) U.S. Cl.
CPC ........... *G06K 9/6218* (2013.01); *G06K 9/623* (2013.01); *G06K 9/6257* (2013.01); *G06N 3/08* (2013.01); *G06V 10/454* (2022.01); *G06V 10/82* (2022.01); *G06T 2207/20081* (2013.01); *G06T 2207/20084* (2013.01)

(58) Field of Classification Search
CPC .................. G06V 10/454; G06V 10/82; G06T 2207/20081; G06T 2207/20084
See application file for complete search history.

(56) References Cited

U.S. PATENT DOCUMENTS 8,965,115 B1 * 2/2015 Khosla ................ G06V 10/806
382/156
9,905,026 B1    2/2018 Huffington et al.
(Continued)

FOREIGN PATENT DOCUMENTS

CN      105136048 A    12/2015
CN      111028220 A    4/2020
(Continued)

OTHER PUBLICATIONS

Li Hong-Wei; Algorithm of rivet contour extraction for aircraft body structure based on 3D point cloud; Journal of Mechanical & Electrical Engineering, vol. 37, No. 6, Jun. 2020; AVIC. XI' AN Aircraft Industry (Group) Company LTD., Xi'an 710089, China.

*Primary Examiner* — Kevin Ky (57) ABSTRACT

A method for extracting rivet points in large scale three-dimensional point cloud based on deep learning is provided. Geometric attribute scalar of a point cloud of aircraft skin is calculated point by point, and the scalar attribute domain is mapped to the two-dimensional image to obtain a two-dimensional attribute scalar map of the point cloud. The 2D attribute scalar map is processed using a convolutional neural network and the probability that each point belongs to a rivet point is calculated. The rivet point cloud is divided through a threshold according to the probability; and the point clouds belonging to a same rivet is clustered from the divided rivet point cloud using Euclidean cluster.

9 Claims, 4 Drawing Sheets

Calculate geometric attribute scalar of a point cloud of aircraft skin point by point, and map scalar attribute domain to the two-dimensional (2D) image to obtain a 2D attribute scalar map of the point cloud — S1

Process 2D attribute scalar map using a convolutional neural network and calculate probability that each point belongs to a rivet point, and divide the rivet point cloud through a threshold according to probability — S2

Cluster the point clouds belonging to a same rivet from the divided rivet point cloud using Euclidean cluster — S3

(51) Int. Cl.
     *G06V 10/82*     (2022.01)
     *G06N 3/08*     (2006.01)

(56) References Cited

U.S. PATENT DOCUMENTS

| | | | | |
|---|---|---|---|---|
| 2002/0038294 | A1* | 3/2002 | Matsugu | G06V 10/454 |
| | | | | 706/20 |
| 2017/0319172 | A1* | 11/2017 | Harley | G06T 15/30 |
| 2021/0019910 | A1* | 1/2021 | Huyn | G06V 10/761 |
| 2021/0073449 | A1* | 3/2021 | Segev | G06F 30/27 |
| 2022/0121875 | A1* | 4/2022 | Wang | G06V 10/7747 |
| 2022/0169381 | A1* | 6/2022 | Alrasheed | G05D 1/0094 |
| 2022/0172433 | A1* | 6/2022 | Ricard | G06T 9/001 |
| 2022/0189070 | A1* | 6/2022 | Rejeb Sfar | G06T 9/002 |

FOREIGN PATENT DOCUMENTS

| | | |
|---|---|---|
| CN | 111080627 A | 4/2020 |
| CN | 111681214 A | 9/2020 |

\* cited by examiner

Height map

Density map

Gaussian curvature map

Mean curvature map

METHOD FOR EXTRACTING RIVET POINTS IN LARGE SCALE THREE-DIMENSIONAL POINT CLOUD BASE ON DEEP LEARNING

CROSS-REFERENCE TO RELATED APPLICATIONS

This application claims the benefit of priority from Chinese Patent Application No. 202011102356.8, filed on Oct. 15, 2020. The content of the aforementioned application, including any intervening amendments thereto, is incorporated herein by reference in its entirety.

TECHNICAL FIELD

This application relates to computer vision and aviation manufacturing technology, and more particularly to a method for extracting rivet points in large scale three-dimensional point cloud based on deep learning.

BACKGROUND

Rivets, a kind of permanent fastener, have been widely used in aircraft manufacturing due to its excellent characteristics. The riveting quality of the rivets on the surface of the aircraft skin directly affects the reliability of the aerodynamic shape of the aircraft, and has an important impact on the flight performance of the aircraft, especially for high-speed aircraft. In addition, bad rivets may weaken the stealth performance of stealth aircraft by increasing the cross section of the radar. Therefore, it is necessary to check the riveting quality of the rivets on the surface of the aircraft skin.

However, thousands of rivets on the aircraft skin are difficult to be detected one by one with the existing methods. Although the method based on image processing can identify the rivet in the image better, subsequent measurements such as leveling degree of rivets cannot be carried out after identifying the rivet due to the image lacks three-dimensional (3D) information.

With the development of 3D scanning technology, the 3D information of the surface of the aircraft skin with rivets can be obtained directly using 3D scanners. However, the difference between the rivet points and non-rivet points on the surface of the aircraft skin is very subtle, and the quality for detecting rivets directly using traditional methods is poor. The rivet points in the point cloud of the aircraft skin can hardly be detected from directly extracting rivets in the large point cloud using the deep learning method, due to the max-pooling operation in the neural network extracts global features but ignores local subtle features.

SUMMARY

An object of this application is to provide a method for extracting rivet points in large scale three-dimensional point cloud based on deep learning to overcome the defects in the prior art.

The technical solutions of this application are described as follows.

A method for extracting rivet points in large scale three-dimensional point cloud based on deep learning, comprising:

S1: calculating geometric attribute scalars of each point cloud from the point cloud aircraft skin, and mapping scalar attribute domain to the two-dimensional (2D) images to obtain a 2D attribute scalar maps of the point cloud;

S2: processing the 2D attribute scalar maps using a convolutional neural network and calculating probability that each point belongs to the rivet points; and extracting the rivet point cloud through a threshold according to the probability; and S3: clustering the points belonging to a same rivet from the extracted rivet point cloud using Euclidean clustering.

In some embodiments, the step S1 comprises:

S1.1: constructing an r-neighborhood $P=\{p_1, p_2, \ldots, p_n\}$ for each point p in the point cloud, and calculating geometric attributes in the neighborhood as scalar attributes of the center point of the neighborhood;

S1.2: standardizing the r-neighborhood into a unit sphere, and calculating a projection plane $\Gamma(p_0, v)$ using principal component analysis method (PCA) according to a point set in the unit sphere; and S1.3: dividing the projection plane into a 56×56 grid, and projecting the points in the neighborhood onto the grid of the projection plane; setting pixel value of projection points in the grid to a geometric attribute scalar value to obtain the 2D attribute scalar map of the point cloud.

The geometric attributes of the point cloud comprises a height from the point to the projection plane, a density, a mean curvature and a Gaussian curvature;

the height from the point to the projection plane is calculated as:

$$h_i = \frac{|v \cdot (p_i - p)|}{|v|},$$

where $p_i$ is a corresponding point of point p in the r-neighborhood, and v is a normal vector of the projection plane;

the density is calculated as:

$$D_p = \frac{N_p}{\frac{4}{3} \cdot \pi \cdot r_d^3},$$

where $4/3 \cdot \pi \cdot r_d^3$ is a volume of a sphere constructed with a point p as center and $r_d$ as a radius, $N_p$ is the number of points in the sphere;

the mean curvature is calculated as:

$$H = 0.5 \cdot (k_1 + k_2),$$

where $k_1$ and $k_2$ are principal curvatures; and
the Gaussian curvature is calculated as:

$$K = k_1 \cdot k_2.$$

In some embodiments, the step S2 comprises:

S2.1: building and training a convolutional neural network model which consist of a first convolution module, a domain attention unit, a second convolution module, and a fully connected layer, and training the convolutional neural network model;

S2.2: processing the 2D attribute scalar maps to extract image features using the first convolution module;

S2.3: pooling the extracted image features to obtain a combined feature using the domain attention unit;

S2.4: calculating the probability that each point belongs to the rivet points using the second convolution module and the fully connected layer; and S2.5: extracting the rivet point cloud through a preset threshold according to the probability.

The first convolution module includes four convolution layers Conv1_1, Conv1_2, Conv2_1, Conv2_2, and maximum pooling layers pool1 and pool2 are arranged behind every two convolution layers, respectively;

the domain attention unit includes three convolution layers Conv3_1, Conv3_2, Conv3_3 and an activation layer Softmax;

the second convolution module includes a convolution layer Conv4_1;

a fully connected layer FC_1 is arranged behind the second convolution module; and a mis-classification is penalized by weighted cross entropy loss in a process of training convolutional neural network model.

A size of convolution kernel of the Conv1_1 is 3×3, the number of convolution kernels is 16, and a step length is 1; a size of convolution kernel of the Conv1_2 is 3×3, the number of convolution kernels is 32, and a step length is 2; a size of convolution kernel of the pool1 is 2×2, and a step length is 2; a size of convolution kernel of the Conv2_1 is 3×3, the number of convolution kernels is 64, and a step length is 1; a size of convolution kernel of the Conv2_2 is 3×3, the number of convolution kernels is 128, and a step length is 1; a size of convolution kernel of the pool2 is 2×2, and a step length is 2;

a size of convolution kernel of the Conv3_1 is 3×3, the number of convolution kernels is 64, and a step length is 1; a size of convolution kernel of the Conv3_2 is 3×3, the number of convolution kernels is 32, and a step length is 1; a size of convolution kernel of the Conv3_3 is 3×3, the number of convolution kernels is 2, and a step length is 1; and a size of convolution kernel of the Conv4_1 is 3×3, the number of convolution kernels is 128, and a step length is 1.

The weighted cross entropy loss is:

$$H = \frac{1}{N}\sum_{1}^{N} w_r \cdot l_i \cdot \log(p(l_i)) + (1-l_i) \cdot \log(1-p(l_i));$$

where $l_i$ (i=1, 2, ..., N) is a label of the point $p_i$ (1 indicates the rivet point, and 0 indicates the non-rivet point), $p(l_i)$ indicates a probability that a point $p_i$ predicted by network is a rivet point, and $w_r$ is a cross entropy weight of the rivet point, which is defined as a ratio of the non-rivet point to the rivet point predicted by network:

$$w_r = \frac{\sum_i [\hat{l}_i = 0]}{\sum_i [\hat{l}_i = 1]}.$$

In some embodiments, the step S2.3 comprises:

predicting a weight $w_i$ for each type of image feature $f_i$ using a attention mechanism by the domain attention unit, characterizing importance of the type of feature, and weight the feature:

$$f'=w_i \cdot f_i = FAU(f_i) \cdot f_i;$$

where $f_i$ is a certain type of image feature extracted by the first convolution module, FAU(·) is the domain attention unit, $w_i$ is a weight calculated by the domain attention unit, and f' is a weighted feature of the feature $f_i$; and combining the weighted features to achieve pooling operations of multiple features:

$$F^*=Conv(concat[w_1 \cdot f_1; w_2 \cdot f_2; w_3 \cdot f_3; w_4 \cdot f_4])$$

where $f_1$, $f_2$, $f_3$, $f_4$ represent the four types of image features, respectively, $w_1$, $w_2$, $w_3$, $w_4$ represent the weights of the corresponding types of features, respectively; concat(·) are combination operations of the features, and Conv(·) are pooling operations implemented through convolution.

In some embodiments, in step S2.5, the threshold of the probability is set to 0.5, points with a probability greater than 0.5 are marked as rivet points, and points with a probability less than or equal to 0.5 are marked as non-rivet points.

In some embodiments, the step S3 comprises:

clustering the point clouds belonging to a same rivet to extract a single rivet point cloud using Euclidean cluster according to the divided results.

This application has the following beneficial effects.

1. The method for extracting point cloud feature of this application combines multiple geometric attributes of the point cloud and can better extract the local subtle features of the point cloud using convolution operations based on images, and can effectively identify and divide a single rivet point cloud.

2. Most parameters of this application based on the deep learning method can be automatically optimized, which can avoid many manually adjusted parameters in the traditional method, thereby simplifying the optimization problem. In addition, as long as the classifier is trained, the classifier can be used to detect rivets directly in the subsequent detection, which makes the processing task faster and can effectively improve work efficiency.

DETAILED DESCRIPTION OF EMBODIMENTS

The preferred embodiments of this application will be described in detail below with reference to the accompanying drawings.

Embodiment

Figure 1:
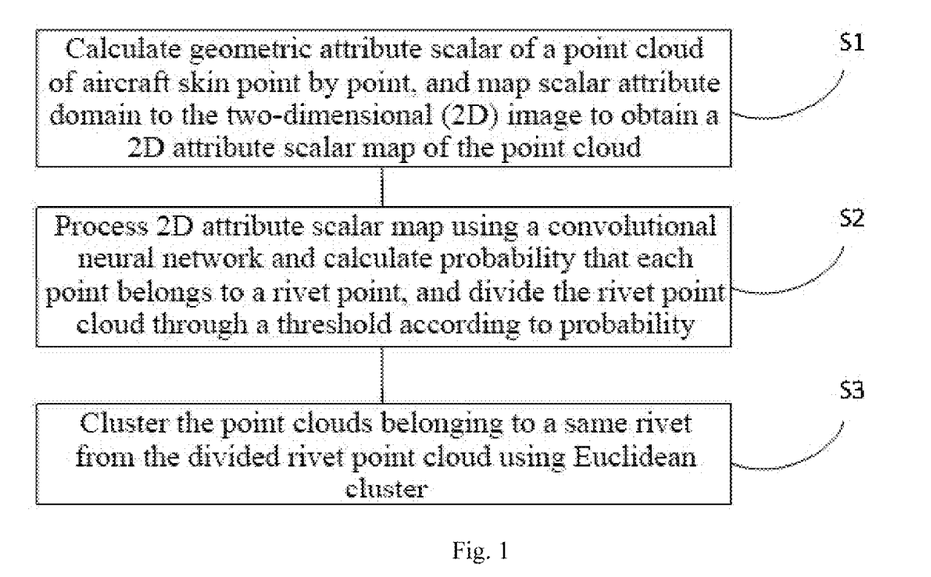
FIG. 1 is a flow chart of a method for extracting a large scale 3D rivet point cloud based on deep learning according to an embodiment of the present disclosure.
Figure 2:
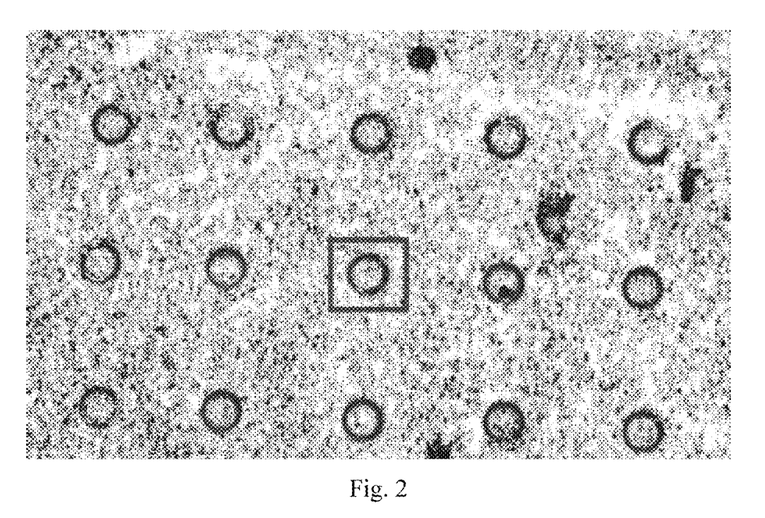
FIG. 2 is a scanning point cloud diagram of an aircraft surface skin with rivets according to an embodiment of the present disclosure.
Figure 3:
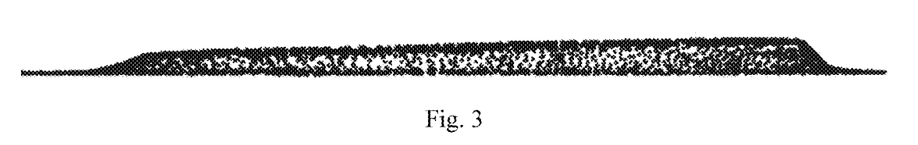
FIG. 3 is a side view of a single rivet point cloud according to an embodiment of the present disclosure.

The scanning point cloud of aircraft skin with rivets is shown in FIG. 2, and a side view of a single rivet point cloud is shown in FIG. 3. As shown in FIG. 1, a method for extracting rivet points in large scale three-dimensional point cloud based on deep learning is provided to solve the problem that it is difficult to accurately extract three-dimensional information of the rivets of aircraft skin in the prior art. The method includes the following steps.

S1: Geometric attribute scalars of each point cloud from the point cloud aircraft skin is calculated, and scalar attribute domain is mapped to the two-dimensional (2D) images to obtain a 2D attribute scalar maps of the point cloud;

S2: the 2D attribute scalar maps are processed using a convolutional neural network and probability that each point belongs to the rivet points is calculated, and the rivet point cloud is extracted through a threshold according to the probability; and S3: the points belonging to a same rivet are clustered from the extracted rivet point cloud using Euclidean clustering.

Figure 4:
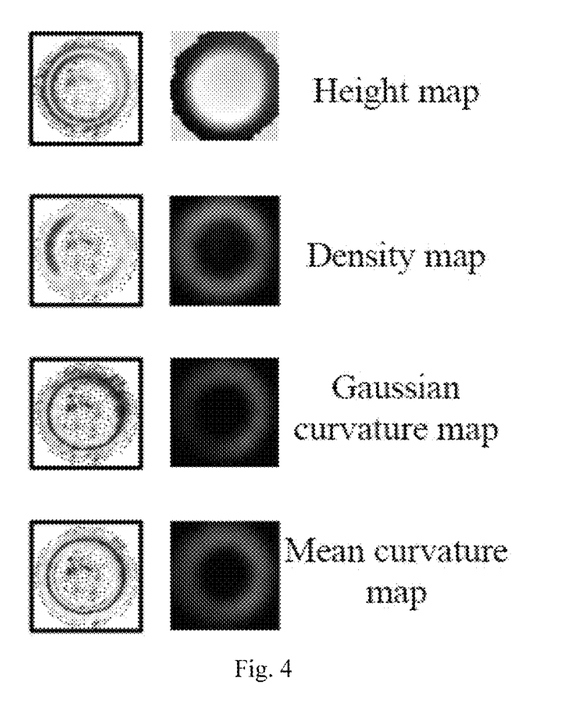
FIG. 4 is a schematic diagram of extracting a two-dimensional scalar map from a point cloud according to an embodiment of the present disclosure.

As shown in FIG. 4, in some embodiments, the step S1 includes the following steps.

S1.1: An r-neighborhood $P=\{p_1, p_2, \ldots, p_n\}$ is constructed for each point p in the point cloud, and geometric attributes in the neighborhood is calculated as scalar attributes of the center point of the neighborhood;

in an embodiment, the radius of the neighborhood is 1.5 times to the radius of rivet head;

S1.2: the r-neighborhood is standardized into a unit sphere, and a projection plane $\Gamma(p_0, v)$ is calculated using principal component analysis method (PCA) according to a point set in the unit sphere; and S1.3: the projection plane is divided into a 56×56 grid, and the points in the neighborhood is projected onto the grid of the projection plane; pixel value of projection points in the grid is set to a geometric attribute scalar value to obtain the 2D attribute scalar map of the point cloud.

In some embodiments, the geometric attributes of the point cloud in step S1.1 includes a height from the point to the projection plane, a density, a mean curvature and a Gaussian curvature;

the height from the point to the projection plane is calculated as:

$$h_i = \frac{|v \cdot (p_i - p)|}{|v|},$$

where $p_i$ is a corresponding point of point p in the r-neighborhood, and v is a normal vector of the projection plane;

the density is calculated as:

$$D_p = \frac{N_p}{\frac{4}{3} \cdot \pi \cdot r_d^3},$$

where $4/3 \cdot \pi \cdot r_d^3$ is a volume of a sphere constructed with a point p as center and $r_d$ as a radius, $N_p$ is the number of points in the sphere;

in an embodiment, $r_d$ is 0.5 time to the radius of the rivet head;

the mean curvature is calculated as:

$$H = 0.5 \cdot (k_1 + k_2),$$

where $k_1$ and $k_2$ are principal curvatures; and
the Gaussian curvature is calculated as:

$$K = k_1 \cdot k_2.$$

In some embodiments, the step S2 includes the following steps.

S2.1: A convolutional neural network model consist of a first convolution module, a domain attention unit, a second convolution module, and a fully connected layer is built and trained;

S2.2: the 2D attribute scalar maps are processed to extract image features using the first convolution module;

S2.3: the extracted image features is pooled to obtain a combined feature using the domain attention unit;

S2.4: the probability that each point belongs to the rivet points is calculated using the second convolution module and the fully connected layer; and S2.5: the rivet point cloud is extracted through a preset threshold according to the probability.

Figure 5:
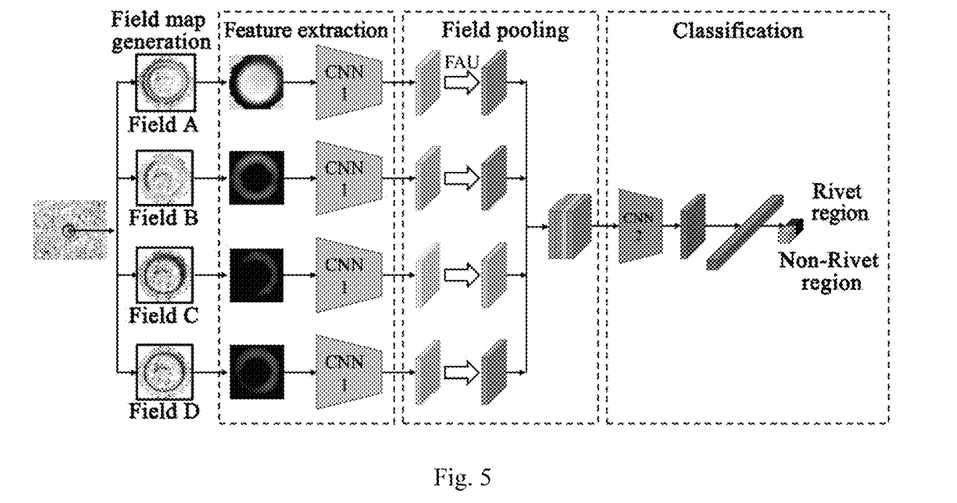
FIG. 5 is a schematic diagram of a convolutional neural network of a method for extracting a large scale 3D rivet point cloud based on deep learning according to an embodiment of the present invention.

As shown in FIG. 5, in some embodiments, the first convolution module includes four convolution layers Conv1_1, Conv1_2, Conv2_1, Conv2_2, and maximum pooling layers pool1 and pool2 are arranged behind every two convolution layers, respectively.

A size of convolution kernel of the Conv1_1 is 3×3, the number of convolution kernels is 16, and a step length is 1; a size of convolution kernel of the Conv1_2 is 3×3, the number of convolution kernels is 32, and a step length is 2; a size of convolution kernel of the pool1 is 2×2, and a step length is 2; a size of convolution kernel of the Conv2_1 is 3×3, the number of convolution kernels is 64, and a step length is 1; a size of convolution kernel of the Conv2_2 is 3×3, the number of convolution kernels is 128, and a step length is 1; a size of convolution kernel of the pool2 is 2×2, and a step length is 2.

The domain attention unit includes three convolution layers Conv3_1, Conv3_2, Conv3_3 and an activation layer Softmax.

A size of convolution kernel of the Conv3_1 is 3×3, the number of convolution kernels is 64, and a step length is 1; a size of convolution kernel of the Conv3_2 is 3×3, the number of convolution kernels is 32, and a step length is 1; a size of convolution kernel of the Conv3_3 is 3×3, the number of convolution kernels is 2, and a step length is 1; and The second convolution module includes a convolution layer Conv4_1.

A size of convolution kernel of the Conv4_1 is 3×3, the number of convolution kernels is 128, and a step length is 1.

A fully connected layer FC_1 is arranged behind the second convolution module.

A mis-classification is penalized by weighted cross entropy loss in a process of training convolutional neural network model In some embodiments, the weighted cross entropy loss is:

$$H = \frac{1}{N}\sum_{1}^{N} w_r \cdot l_i \cdot \log(p(l_i)) + (1 - l_i) \cdot \log(1 - p(l_i));$$

where $l_i$ (i=1, 2, . . . , N) is the label of the point $p_i$ (1 indicates the rivet point, and 0 indicates the non-rivet point), $p(l_i)$ indicates a probability that a point $p_i$ predicted by network is a rivet point, and $w_r$ is a cross entropy weight of the rivet point, which is defined as a ratio of the non-rivet point to the rivet point predicted by network:

$$w_r = \frac{\sum_i [\hat{l}_i = 0]}{\sum_i [\hat{l}_i = 1]}.$$

In some embodiments, the rivet point id divided through threshold according to the probability. The threshold of the probability is set to 0.5, points with a probability greater than 0.5 are marked as rivet points, and points with a probability less than or equal to 0.5 are marked as non-rivet points.

Figure 6:
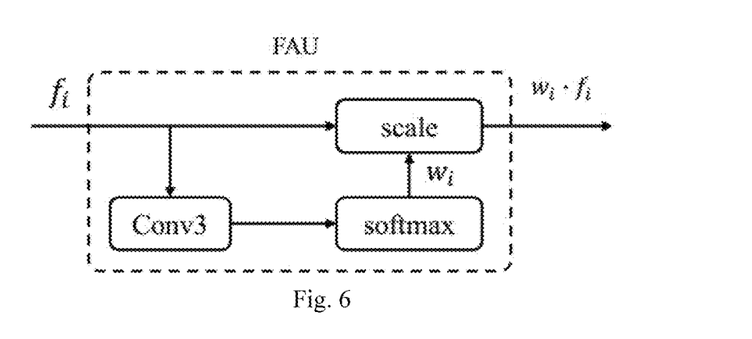
FIG. 6 is a schematic diagram of a domain attention unit according to an embodiment of the present disclosure.

In some embodiments, the schematic diagram of a domain attention unit is shown in FIG. 6. In step S2.3, a weight $w_i$ is predicted for each type of image feature $f_i$ using a attention mechanism by the domain attention unit, importance of the type of feature are characterized, and the features are weighted:

$$f'=w_i \cdot f_i = FAU(f_i) \cdot f_i;$$

where $f_i$ is a certain type of image feature extracted by the first convolution module, FAU(·) is the domain attention unit, $w_i$ is a weight calculated by the domain attention unit, and f' is a weighted feature of the feature $f_i$; and the weighted features are combined to achieve pooling operations of multiple features:

$$F^*=Conv(concat[w_1 \cdot f_1; w_2 \cdot f_2; w_3 \cdot f_3; w_4 \cdot f_4]);$$

where $f_1$, $f_2$, $f_3$, $f_4$ represent the four types of image features, respectively, $w_1$, $w_2$, $w_3$, $w_4$ represent the weights of the corresponding types of features, respectively; concat(·) are combination operations of the features, and Conv(·) are pooling operations implemented through convolution.

Figure 7:
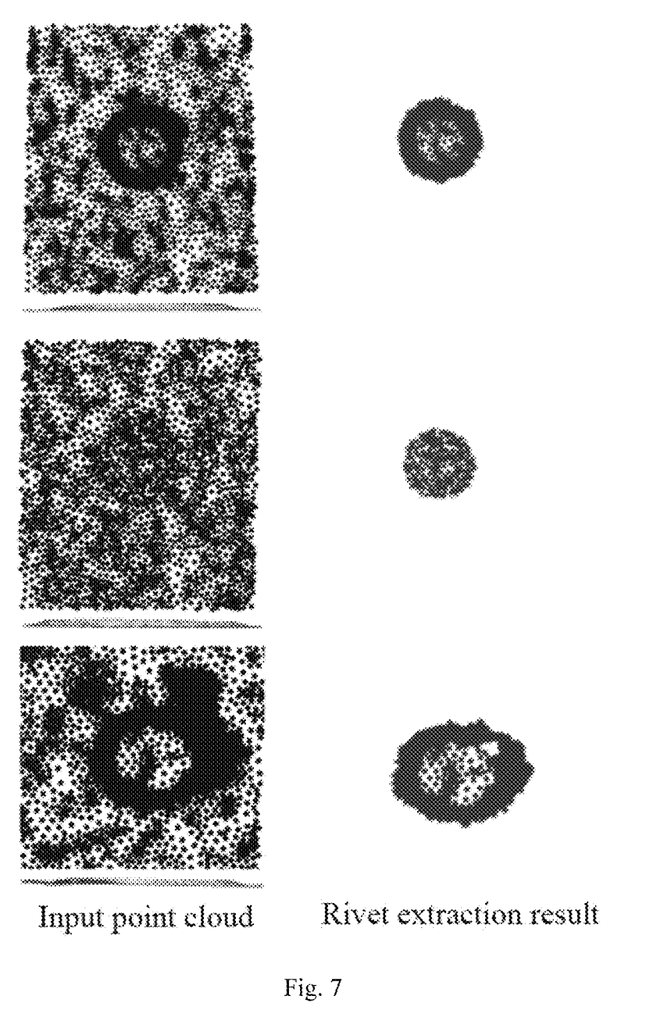
FIG. 7 shows a rivet extraction result according to an embodiment of the present disclosure.

In some embodiments, in step S3, the point clouds belonging to a same rivet are clustered to extract a single rivet point cloud using Euclidean cluster according to the divided results. The rivet extraction result is shown in FIG. 7.

The method for extracting rivets based on a large scale point cloud of this embodiment converts the direct learning of the point cloud into the learning of the image. At the same time, various geometric attribute information are comprehensively considered using the attention mechanism, which increases the ability of the network to extract local subtle features. It can effectively extract a single rivet point cloud accurately from a large point cloud.

The above are only the preferred embodiments of the present disclosure, and are not intended to limit the scope of the present disclosure. Any changes, equivalent modifications and improvements made by those skilled in the art without departing from the spirit of the present disclosure shall fall within the scope of the present disclosure.

What is claimed is:

1. A method for extracting rivet points in large scale three-dimensional point cloud based on deep learning, comprising:
   S1: calculating geometric attribute scalars of each point cloud from the point cloud aircraft skin, and mapping scalar attribute domain to the two-dimensional (2D) images to obtain a 2D attribute scalar maps of the point cloud;
   S2: processing the 2D attribute scalar maps using a convolutional neural network and calculating probability that each point belongs to the rivet points; and extracting the rivet point cloud based on a threshold according to the probability; and
   S3: clustering the points belonging to the same rivet from the extracted rivet point cloud using Euclidean clustering,
   wherein the step S1 comprises:
   S1.1: constructing an r-neighborhood $P=\{p_1, p_2, \ldots, p_n\}$ for each point p in the point cloud, and calculating geometric attributes in the neighborhood as scalar attributes of the center point of the neighborhood;
   S1.2: standardizing the r-neighborhood into a unit sphere, and calculating a projection plane $\Gamma(p_0, v)$ using principal component analysis method according to a point set in the unit sphere; and
   S1.3: dividing the projection plane into a 56×56 grid, and projecting the points in the neighborhood onto the grid of the projection plane; setting pixel value of projection points in the grid to a geometric attribute scalar value to obtain the 2D attribute scalar map of the point cloud.

2. The method of claim 1, wherein in step S1.1, the geometric attributes of the point cloud comprises a height from the point to the projection plane, a density, a mean curvature and a Gaussian curvature;
   the height from the point to the projection plane is calculated as:

$$h_i = \frac{|v \cdot (p_i - p)|}{|v|},$$

where $p_i$ is a corresponding point of point p in the r-neighborhood, and v is a normal vector of the projection plane;
the density is calculated as:

$$D_p = \frac{N_p}{\frac{4}{3} \cdot \pi \cdot r_d^3},$$

where $4/3 \cdot \pi \cdot r_d^3$ is a volume of a sphere constructed with a point p as center and $r_d$ as a radius, $N_p$ is the number of points in the sphere;
the mean curvature is calculated as:

$$H=0.5 \cdot (k_1+k_2),$$

where $k_1$ and $k_2$ are principal curvatures; and
the Gaussian curvature is calculated as:

$$K=k_1 \cdot k_2.$$

3. The method of claim 1, wherein the step S2 comprises:
   S2.1: building and training a convolutional neural network model which consist of a first convolution module, a domain attention unit, a second convolution module, and a fully connected layer;
   S2.2: processing the 2D attribute scalar maps to extract image features using the first convolution module;
   S2.3: pooling the extracted image features to obtain a combined feature using the domain attention unit;
   S2.4: calculating the probability that each point belongs to the rivet points using the second convolution module and the fully connected layer; and
   S2.5: extracting the rivet point cloud through a preset threshold according to the probability.

4. A method of claim 3, wherein in step S2.1, the first convolution module includes four convolution layers Conv1_1, Conv1_2, Conv2_1 and Conv2_2; and maximum pooling layers pool1 and pool2 are arranged behind every two convolution layers, respectively;
   the domain attention unit includes three convolution layers Conv3_1, Conv3_2 and Conv3_3, and an activation layer Softmax;
   the second convolution module includes a convolution layer Conv4_1;

a fully connected layer FC_1 is arranged behind the second convolution module; and a mis-classification is penalized by weighted cross entropy loss in a process of training convolutional neural network model.

5. The method of claim 4, wherein a size of convolution kernel of the Conv1_1 is 3×3, the number of convolution kernels is 16, and a step length is 1; a size of convolution kernel of the Conv1_2 is 3×3, the number of convolution kernels is 32, and a step length is 2; a size of convolution kernel of the pool1 is 2×2, and a step length is 2; a size of convolution kernel of the Conv2_1 is 3×3, the number of convolution kernels is 64, and a step length is 1; a size of convolution kernel of the Conv2_2 is 3×3, the number of convolution kernels is 128, and a step length is 1; a size of convolution kernel of the pool2 is 2×2, and a step length is 2;

a size of convolution kernel of the Conv3_1 is 3×3, the number of convolution kernels is 64, and a step length is 1; a size of convolution kernel of the Conv3_2 is 3×3, the number of convolution kernels is 32, and a step length is 1; a size of convolution kernel of the Conv3_3 is 3×3, the number of convolution kernels is 2, and a step length is 1; and a size of convolution kernel of the Conv4_1 is 3×3, the number of convolution kernels is 128, and a step length is 1.

6. The method of claim 4, wherein the weighted cross entropy loss is calculated as:

$$H = \frac{1}{N}\sum_{1}^{N} w_r \cdot l_i \cdot \log(p(l_i)) + (1 - l_i) \cdot \log(1 - p(l_i));$$

where $l_i$ (i=1, 2, ..., N) is the label of the point $p_i$ (1 indicates the rivet point, and 0 indicates the non-rivet point), $p(l_i)$ indicates a probability that a point $p_i$ predicted by network is a rivet point, and $w_r$ is a cross entropy weight of the rivet point, which is defined as a ratio of the non-rivet point to the rivet point predicted by network:

$$w_r = \frac{\sum_i [\hat{l}_i = 0]}{\sum_i [\hat{l}_i = 1]}.$$

7. The method of claim 3, wherein the step S2.3 comprises:

predicting a weight $w_i$ for each type of image feature $f_i$ using a attention mechanism by the domain attention unit, characterizing importance of the type of feature, and weight the feature:

$$f' = w_i \cdot f_i = FAU(f_i) \cdot f_i;$$

where $f_i$ is a certain type of image feature extracted by the first convolution module, FAU(·) is the domain attention unit, $w_i$ is a weight calculated by the domain attention unit, and f is a weighted feature of the feature $f_i$; and combining the weighted features to achieve pooling operations of multiple features:

$$F^* = Conv(concat[w_1 \cdot f_1; w_2 \cdot f_2; w_3 \cdot f_3; w_4 \cdot f_4]);$$

where $f_1$, $f_2$, $f_3$, $f_4$ represent the four types of image features, respectively, and $w_1$, $w_2$, $w_3$, $w_4$ represent the weights of the corresponding types of features, respectively; concat(·) are combination operations of the features, and Conv(·) are pooling operations implemented through convolution.

8. The method of claim 3, wherein in step S2.5, the threshold of the probability is set to 0.5; points with a probability greater than 0.5 are marked as rivet points; and points with a probability less than or equal to 0.5 are marked as non-rivet points.

9. The method of claim 1, wherein the step S3 comprises:

clustering the point clouds belonging to a same rivet to extract a single rivet point cloud using Euclidean cluster according to the divided results.

* * * * *